United States Patent Office 3,553,948
Patented Jan. 12, 1971

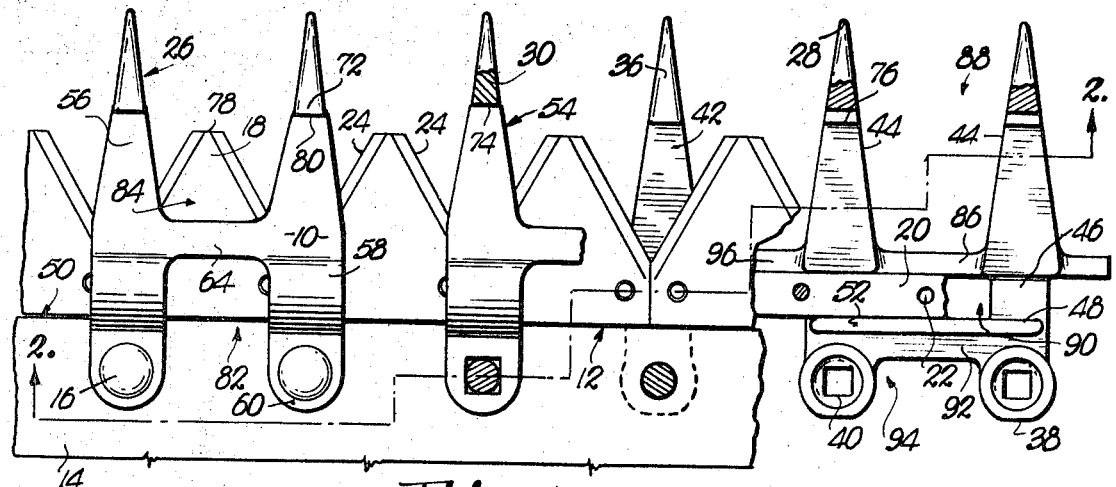
Fig. 1.
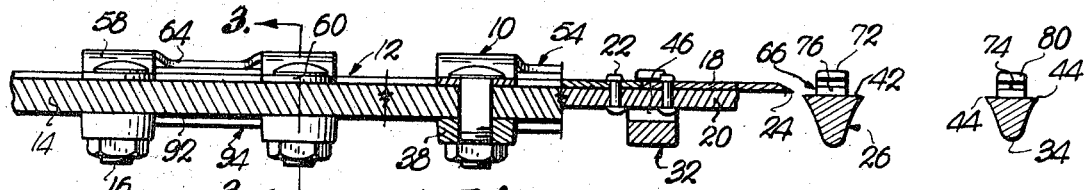
Fig. 2.
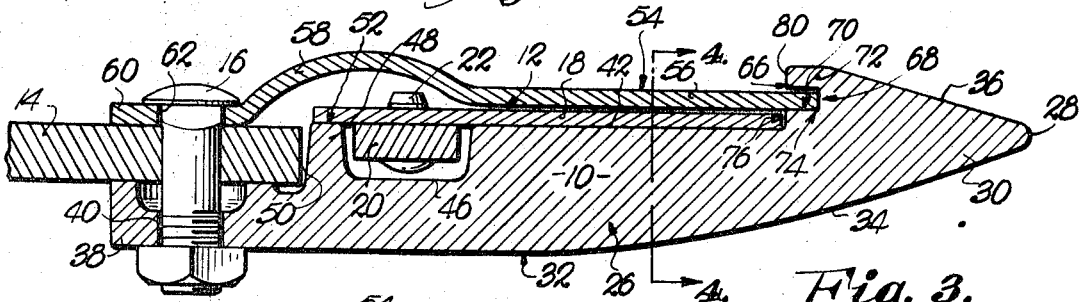
Fig. 3.
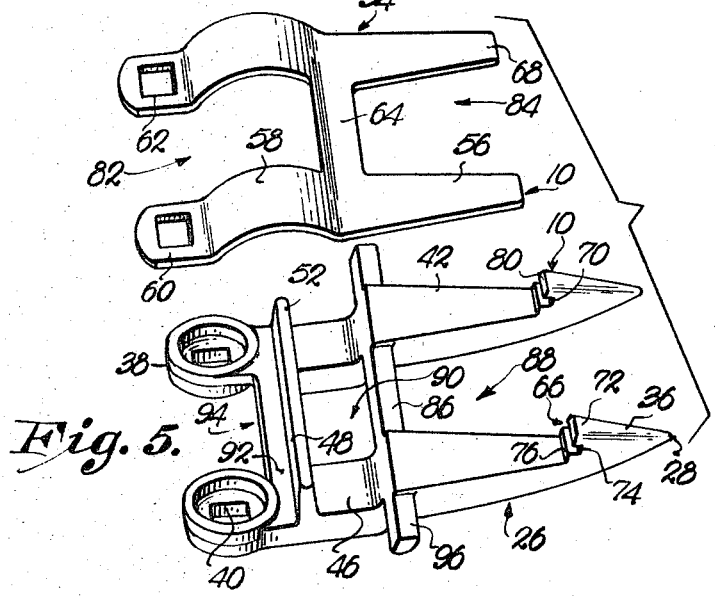
Fig. 4.
Fig. 5.
INVENTOR.
Allen A. White
BY Schmidt, Johnson, Hovey,
Williams & Chase
ATTORNEYS.

3,553,948
SICKLE GUARD
Allen A. White, Peabody, Kans., assignor to Hesston Corporation, Hesston, Kans., a corporation of Kansas
Continuation-in-part of application Ser. No. 659,361, Aug. 9, 1967. This application Jan. 12, 1970, Ser. No. 2,028
Int. Cl. A01d 55/10
U.S. Cl. 56—307          8 Claims

ABSTRACT OF THE DISCLOSURE

A sickle guard is rendered self-cleaning and capable of withstanding virtually all forces during normal use by the provision of separable, upper and lower, complemental components both of which have a multiple of integrally interconnected elements. Spaced fingers support the reciprocable sickle and spaced straps hold the sickle down as well as prevent finger breakage. The joinders between the fingers and between the straps are shaped and disposed to permit trash and dirt buildup, to properly reinforce both components, and to effectively hold the sickle within a non-tilting, rectilinear path of travel. A simple, yet effective, strong and easily released interlock is provided between the fingers and the leading ends of the straps.

---

This is a continuation-in-part of my co-pending application Ser. No. 659,361, filed Aug. 9, 1967, now abandoned, and entitled "Double Sickle And Guard."

The primary object of my present invention is to minimize sickle guard breakage by the provision of a fingerplate arrangement wherein both of such components are in multiples,, with the fingers, as well as the straps of the plate, integrally joined, and with the plates locked to the fingers in such manner as to cause the entire guard to absorb the forces which would otherwise cause damage.

Another object of the instant invention of substantially equal importance is to provide a sickle guard that does not clog with debris even under the most adverse of conditions by virtue of an arrangement of interconnecting ribs, bridges, crossheads and strips between the elements such as to present a multiplicity of notches, gaps, spaces, openings and other clearances from which trash and dirt are automatically dislodged and free to flow.

Still another important object of my instant invention is the provision of a sickle guard that may be quickly and easily replaced and permit replacement of the sickle sections in the field without removal of the sickle.

A further object of the present invention is to provide a sickle guard that has but two simple parts which can be easily and rapidly manufactured at minimum expense.

Yet another of my objects is to provide a guard that will effectively perform its essential functions of protecting the sickle and providing proper cutting action, not only because of its self-cleaning feature, but by virtue of the way it holds the sickle in place with all cutting and shearing edges in proper relationship.

In the drawing:

FIG. 1 is a top plan view of a sickle guard made pursuant to my present invention shown in its operating relationship to the sickle, parts being broken away and in section for clearness;

FIG. 2 is a cross-sectional view taken on line 2—2 of FIG. 1;

FIG. 3 is an enlarged cross-sectional view taken on line 3—3 of FIG. 2;

FIG. 4 is a cross-sectional view taken on line 4—4 of FIG. 3; and

FIG. 5 is an exploded perspective view of one of the guards per se.

Guards 10 for sickle 12 are adapted for releasable attachment to an elongated, normally horizontal supporting beam or cutter bar 14 by bolt and nut fasteners 16. Elongated sickle 12 reciprocates longitudinally thereof within a path parallel to the longitudinal axis of the beam 14 and has a series of generally triangular, flat cutter sections 18 each secured to an elongated bar 20 by a pair of rivets 22. Each section 18 is beveled to present opposed cutting edges 24 that diverge as the sickle bar 20 is approached.

Each guard 10 includes at least two spaced, elongated fingers 26 that are tapered toward the leading ends 28 thereof, presenting a pointed toe 30. Fingers 26 have ground-engaging soles 32, the forwardmost lengths 34 whereof slope upwardly toward ends 28, converging with the inclined tops 36 of the toes 30. Oppositely to the lengths 34, the soles 32 terminate in heels 38 having perforations 40 for receiving the bolts of fasteners 16.

Each finger 26 has a normally horizontal, trapezoidal platform 42 for slidably supporting the section 18. Each platform 42 is in turn provided with opposed shearing edges 44 that cooperate with the cutting edges 24 in the severance of standing crops. Edges 44 converge as the toes 30 are approached.

Each finger 26 is also provided with a U-shaped, upwardly facing, transverse notch 46 between its platform 42 and its heel 38. The notches 46 receive the bar 20 and are spaced from the latter, as well as from the heads of the rivets 22, clearing the same for free reciprocation of the sickle 12. The ends of the notches 46 are open for constant lateral disposal therefrom of trash, dirt and gummy accumulations resulting from the juices of the crop being cut and other moisture.

An elongated, transverse rib abuts the leading edge 50 of the beam 14 and integrally interconnects the fingers 26. Rib 48 is spaced above the soles 32 and disposed between the notches 46 and the heels 38. The upper edge 52 of the rib 48 is coplanar with the platforms 42 and slidably supports the sections 18 of sickle 12 rearwardly of the bar 20.

Elongated plates 54 overlying the fingers 26 are each provided with a flat strap 56 in spaced parallelism with corresponding platforms 42. Straps 56 are shaped and sized complementally with the platforms 42 and function in part to hold the sections 18 on the platforms 42.

Each plate 54 has an upwardly bowed, transversely flat, trash-clearing hump 58 arched over the upper upset ends of rivets 22. Humps 58 are disposed rearwardly of the straps 56 and terminate in flat ears 60 that are offset downwardly from the planes of straps 56 so as to be coplanar with the sections 18. Each ear 60 has a perforation 62 receiving the bolts of fasteners 16, the latter thereby serving to clamp the beam 14 tightly between the heels 38 and the ears 60.

A single, elongated, flat, transverse strip 64 integrally interconnects the strap 56 adjacent the hump 58. The strip 64 is coplanar with the straps 56 and serves to hold the sections 18 down forwardly of the rivets 22.

Toes 30 are provided with transverse, rearwardly-facing slots 66 forwardly of the platforms 42 for receiving the forwardmost truncated ends 68 of the straps 56. Each slot 66 presents a shelf 70 that is engaged by the corresponding strap 56, shelves 70 being disposed in a common plane that is higher than the planes of platforms 42. Rearwardly extending lips 72 integral with toes 30 overlie the straps 56 and hold the latter tightly against the shelves 70. Upright abutments 74 forming the inner ends of slots 66 are engaged by the ends 68 of the strap 56. Fingers 26 have upright shoulders 76 between the shelves 70 and the platforms 42 forwardly of the forwardmost truncated ends 78 of sections 18 and vertically aligned with the rearmost, free ends 80 of the lips 72.

The strip 64 forms the bight of a rearwardly facing, U-shaped, trash clearing opening 82 in the plate 54 between the humps 58 and between the ears 60, the opening 82 being above the rivets 22, the rib 48 and the beam 14 such that trash is free to flow rearwardly over the beam 14 between the ears 60. Similarly the strip 64 forms the bight of a forwardly facing, U-shaped, crop-receiving hole 84 in the plate 54 between the straps 56 above the sections 18.

Fingers 26 are integrally joined at the forwardmost edges of the notches 46 by an elongated, transverse bridge 86 which forms the bight of a forwardly facing, U-shaped crop-receiving space 88 beneath the platforms 42. A trash and dirt clearing gap 90 extends transversely between notches 46 and fore and aft between the rib 48 and the bridge 86 beneath sections 18. Bridge 86 is spaced below the sections 18 and above the sole 32 for free flow of trash and dirt over and under the bridge 86 to the gap 90.

An elongated, transverse crosshead 92 integrally joins the fingers 26 and the rib 48 between heels 38 and rib 48. Crosshead 92 is spaced below edge 50 of beam 14 and above the sole 32, and forms the bight of a U-shaped clearance 94 between the heels 38 for free flow of trash and dirt passing beneath the crosshead 92.

Opposed, laterally extending prongs 96, integral with fingers 26, are aligned with the bridge 86. Each prong 96 abuts the proximal prong of the adjacent guard 10, thereby cooperating with fasteners 16 in holding the guards 10 against lateral shifting or swinging on the beams 14. The prongs 96 are spaced below the planes of platforms 42 and above the soles 32 for free flow of trash and dirt over and beneath the prongs 96.

Guards 10 are, therefore, in all respects self-cleaning. The platforms 42 are maintained in a clean condition as the sections 18 reciprocate thereacross, and all material that is thus constantly removed from the platforms 42 drops into the spaces 88 for free flow beneath the bridge 86, the rib 48 and the crosshead 92. Moreover, the gaps 90 receive all foreign material that passes over the bridge 86 as well as that which is constantly cleaned from the notches 46 by the reciprocating bar 20. Material passing beneath the strip 64 and that which flows laterally from beneath the humps 58 passes into the opening 82 for flow over and behind the beams 14. Even when operating in muddy conditions because of moisture in the soil and on the crops or because of juices escaping from the cut crop, the guards 10 are kept cleaned for free reciprocation of sickle 12 and proper cutting between edges 24 and 44.

Of equal importance is the exceptional strength of the guards 10 such that breakage, except on severe impact, is virtually eliminated. The fasteners 16, holding the rib 48 against edge 50 of beam 14, the prongs 96 in relative abutment, and the integral joinder of fingers 26 by rib 48, bridge 86 and crosshead 92, are cooperating factors to prevent lateral movement of the guards 10 relative to beam 14 as well as lateral movement of the fingers 26 toward and away from each other.

However, frequent breakage of conventional guards is, for the most part, that occasioned by upward forces on the toes 30 as the sole lengths 34 pass over obstructions and as the ends 28 strike heavy objects. However, in the instant invention, such forces are effectively opposed by the straps 56 engaged at their ends 68 against the abutments 74 of slots 66. Even with tremendous forces applied upwardly to the fingers 26 at the sole lengths 34, the plates 54 will not bow such as to permit the guards 10 to bend, deflect or displace from their proper position with respect to each other and to the beam 14. The straps 56 remain locked within the slots 66 because their ends 68 are held in line contact with the abutments 74 by the fasteners 16, and there is always a firm gripping of the straps 56 between the lip 72 and the shelves 70. Such relationship is maintained because of the strip 64 cooperating with the fasteners 16 in holding the straps 56 properly spaced apart.

Repair and replacement of parts is easy and simple. Even in the field with a limited number of tools any one or more guards 10 can be replaced by merely releasing their fasteners 16 without need to remove the sickle 12. Moreover, the sections 18 are readily accessible for replacement in the field without removal of sickle 12 by simply releasing a guard 10 proximal to the section 18 to be replaced.

Manisfestly, if each guard 10 is provided with multiples of three or more fingers 26, the rib 46 and the crosshead 92 would be lengthened, and the number of heels 38 and bridges 86 would be increased accordingly. Also the number of straps 56, humps 58 and ears 60 would be increased and each plate 54 would then have two or more strips 64.

In addition to the purposes of the prongs 96 as above described, they serve the primary function of keeping the standing crop out of the vertexes between cutting edges 24 of adjacent sections 18 so that the crop is forced to the shearing edges 44 of guards 10.

Having thus described the invention, what is claimed as new and desired to be secured by Letters Patent is:

1. In combination with an elongated, normally horizontal supporting beam, a guard for a sickle reciprocable within a path parallel to the longitudinal axis of the beam, said sickle having a series of generally triangular, flat cutter sections secured by rivets to an elongated bar and beveled to present opposed cutting edges diverging toward said bar, said guard comprising:

a number of spaced, elongated fingers, each tapered toward the leading end thereof, presenting a pointed toe, and each provided with a ground-engaging sole terminating in a perforated heel, each finger having a normally horizontal, flat, trapezoidal platform substantially coplanar with the upper face of said beam for slidably supporting said sections, each platform being provided with opposed shearing edges cooperable with said cutting edges in the severance of standing crops and converging as said toe is approached, each finger being provided with a U-shaped, upwardly-facing, transverse notch between its platform and its heel for clearing the bar and the rivets of said sickle;

elongated, transverse rib means abutting the leading edge of the beam, said rib means being spaced above said soles and integrally interconnecting the fingers between their notches and their heels, the upper edge of the rib means being coplanar with the platforms and said upper face of the beam for slidably supporting the sections rearwardly of the bar;

an elongated, finger-supporting plate overlying said fingers for resisting upward forces on said toes, each plate having a flat strap spaced above the corresponding platform and parallel therewith, said straps being shaped and sized complementally with said platforms;

said plate having an upwardly bowed, transversely flat, trash-clearing hump disposed rearwardly of each strap respectively, arched over said rivets and terminating in a flat, perforated ear coplanar with said sections;

releasable fasteners passing through the perforations of the ears and heels for tightly clamping said beam flatly between the ears and the heels in engagement therewith; and elongated, flat, transverse strip means spaced above said sections, coplanar with said straps, and integrally interconnecting the latter adjacent the humps and forwardly of said rivets, said toes having transverse, rearwardly-facing slots forwardly of the corresponding platforms for receiving the forwardmost truncated ends of the straps, presenting strap-engaging shelves disposed in a common plane higher than the planes of the platforms, and rearwardly extending lips in overlying engagement with said straps, whereby said ends of the straps are gripped between the lips and the shelves, said toes having upright abutments in line contact with said ends of the straps, said fingers having upright shoulders between the shelves and the platforms forwardly of the sections and vertically aligned with the rearmost, free ends of the lips.

said plates being resistant to bowing in response to upward forces applied to said soles, thereby reducing breakage of said fingers by opposing the tendency toward upward bending and deflection of the fingers as the result of said forces.

2. A sickle guard as claimed in claim 1 wherein said humps and said ears are spaced apart, presenting a U-shaped, trash-clearing opening above the sections and the beams facing rearwardly from the strip means, with the latter forming the bight of said opening.

3. A sickle guard as claimed in claim 2 wherein said straps are spaced apart throughout their lengths, presenting a U-shaped, crop-receiving hole above the sections facing forwardly from the strip means, with the latter forming the bight of said hole, said straps being spaced above said sections in parallelism therewith for limiting the extent of upward movement of the latter away from the platforms.

4. A sickle guard as claimed in claim 3 wherein is provided an elongated, transverse bridge integrally joining the fingers at the forwardmost edges of the notches, presenting a U-shaped, crop-receiving space facing forwardly from the bridge beneath the platforms, with the bridge forming the bight of said space.

5. A sickle guard as claimed in claim 4 wherein is provided a trash-clearing gap extending transversely between the notches and fore and aft between the rib means and the bridge and beneath the sections.

6. A sickle guard as claimed in claim 5 wherein is provided an elongated, transverse crosshead integrally joining the fingers and the rib means between the latter and said heels.

7. A sickle guard as claimed in claim 6 wherein said crosshead is spaced below said edge of the beam and spaced above said sole.

8. A sickle guard as claimed in claim 7 wherein said heels are integral with the crosshead, extend rearwardly therefrom and are transversely spaced for clearance of trash flowing beneath the crosshead.

References Cited

UNITED STATES PATENTS

| | | | |
|---|---|---|---|
| 642,485 | 1/1900 | Pierson | 56—296 |
| 749,613 | 1/1904 | Jones | 56—298 |
| 992,691 | 5/1911 | Seger et al. | 56—305 |
| 1,085,349 | 1/1914 | Likely | 56—298 |
| 1,185,442 | 5/1916 | Southwick | 56—310 |
| 2,246,943 | 6/1941 | Jones | 56—298 |
| 3,151,434 | 10/1964 | Hamel | 56—296 |
| 3,171,242 | 3/1965 | Scarnato et al. | 56—310 |
| 3,401,512 | 9/1968 | Pool et al. | 56—298 |

J. A. OLIFF, Assistant Examiner

LOUIS G. MANCENE, Primary Examiner